3,197,371
PROCESS FOR TREATING HYPER-
CHOLESTERALEMIA
Joseph P. Dailey, Kankakee, Ill., assignor to Armour
Pharmaceutical Company, Chicago, Ill., a corporation
of Delaware
No Drawing. Filed July 6, 1962, Ser. No. 208,689
6 Claims. (Cl. 167—65)

This invention relates to treatment in which there is obtained lowering of the serum cholesterol level in animals and human beings, and more particularly to the administration to a patient afflicted with hypercholesterolemia of an arachidonic acid-containing phospholipid.

This application is a continuation-in-part of my co-pending application Serial No. 705,142 filed December 26, 1957, now abandoned.

In relatively recent years it has been observed that certain forms of abnormal lipid metabolism are characterized by a relative increase in the cholesterol content of the blood of animals and human beings, i.e. hypercholesterolemia. L. W. Kinsell et al. have reported in the Journal of Clinical Endocrinology and Metabolism; 12, 909, (1952) and in the Journal of Clinical Nutrition; 1, 224 (1953), that the administration of vegetable triglycerides as a dietary source of fat to humans afflicted with hypercholesterolemia produces a relative lowering of the serum cholesterol level, and that the subsequent removal from the diet of such vegetable triglycerides results in the readjustment of serum cholesterol to the pretreatment concentration. Furthermore, Kinsell et al., American Journal of Clinical Nutrition; 4, 285 (1956), have suggested that linoleic acid, a fatty acid containing 18 carbon atoms and two double bonds, is an active component of vegetable triglycerides in producing this lowering of the serum cholesterol level. Also, Birch, Journal of Biological Chemistry; 124, 775, (1938) and Witten and Holman, Archives of Biochemistry and Biophysics; 41, 266 (1952), have observed a biological relationship involving linoleic acid and pyridoxine, vitamin $B_6$, in the in vivo formation of arachidonic acid. Moreover, it is now believed that, in a pyridoxine-deficient animal or human being, pyridoxine is required to obtain conversion of linoleic to arachidonic acid, and that arachidonic acid, a fatty acid containing 20 carbon atoms and four double bonds, may be involved in lowering the serum cholesterol level.

In conjunction with this lowering of the serum cholesterol level, there is also obtained a corresponding lowering of the serum content of cholesterol fatty acid esters and a relative increase in the Iodine Number of the fatty acid components of such serum cholesterol fatty acid esters, i.e. an increase in the unsaturation of the fatty acid components of such serum cholesterol fatty acid esters.

There is described by Kinsell et al. in a preparation in the form of an oil-in-water emulsion containing, as the principal constituent, safflower oil, a vegetable triglyceride containing approximately 70% of linoleic acid, which, when utilized as a dietary source of fat, produces a significant reduction in the serum cholesterol level of patients afflicted with hypercholesterolemia. However, it will be apparent that with a preparation of this type large quantities of the linoleic acid-containing triglyceride are required to obtain the desired degree of reduction in the serum cholesterol level, and that a period of several days will elapse before a significant reduction in the serum cholesterol level is manifested.

It has now been discovered that the administration to an animal or human being afflicted with hypercholesterolemia of a phospholipid containing at least one arachidonic radical results in a significant lowering of the serum cholesterol level within a strikingly short period of time, as compared to that period of time required with linoleic acid-containing triglycerides to effect a similar degree of reduction in the serum cholesterol level. Moreover, the significant lowering of the serum cholesterol level in accordance with this invention is obtained with an amount of the arachidonic acid-containing phospholipid which is significantly less than that quantity of linoleic acid-containing triglyceride required to effect a similar reduction in the serum cholesterol level. That is, a substantially equal reduction in the serum cholesterol level is obtained with an amount of this arachidonic acid-containing phospholipid equivalent to about one-tenth by weight of the linoleic acid-containing triglyceride. There is also produced by the administration of the arachidonic acid-containing phospholipid according to this invention a corresponding reduction in the serum cholesterol fatty acid esters and a relative increase in the Iodine Number of the fatty acid components of such serum cholesterol fatty acid esters. Also, the degree of unsaturation of such fatty acid components following the administration of a given amount of this arachidonic acid-containing phospholipid is significantly greater than that obtained with much larger amounts of ethyl linoleate or trilinoleate.

The term phospholipid conventionally refers to phosphorus-containing lipids or phosphatides. The several types of phospholipids are referred to as lecithins, cephalins, sphingomyelins and cerebrosides. Lecithins and cephalens are amine esters of phosphatidic acids, and have the general formula:

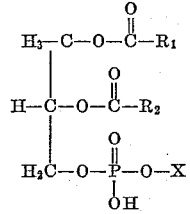

wherein $R_1$ and $R_2$ represent the hydrocarbon components of fatty acid radicals and X is (1) a choline radical in lecithin and (2) an ethanolamine radical (phosphatidyl ethanolamine) or a serine radical (phosphatidyl serine in cephalins). Also, there is sometimes classed as a cephalin, the compound lipositol or inositol phosphatide which, although the general formula is not known, presumably contains glycerol, phosphoric acid, galactose, inositol, amine and fatty acid radicals. The ester groups occupying exterior positions in lecithin and cephalin molecules are conventionally referred to as being in the alpha position, while the interior ester group thereof is referred to as being in the beta position. Thus, in the foregoing formula, the $R_1$ fatty acid ester group occupies an alpha position, while the $R_2$ fatty acid ester group occupies a beta position. The sphingomyelins, as well as the cerebrosides, contain sphingosine, a dihydroxy fatty alcohol containing 18 carbon atoms, an amine group, and a fatty acid contained in an amide linkage; the sphingomyelins contain also a phosphoryl choline radical, while the cerebrosides contain also a monosaccharide such as galactose, and thus are sometimes referred to as glycolipids. Although any arachidonic acid-containing phospholipid may be employed in accordance with this invention, especially desirable results are to be obtained with those arachidonic acid-containing phospholipids of the lecithin and cephalin type.

The arachidonic acid-containing phospholipid employed in accordance with this invention should contain at least one arachidonic acid radical. Thus, if sphingomyelins or cerebrosides are utilized the single fatty acid constituent thereof should be an arachidonic acid radical. Also, if phospholipids of the preferred lecithin or cephalin type are employed, the arachidonic acid radical may be contained in either the alpha or beta position thereof, i.e. when either $R_1$ or $R_2$ in the foregoing formula represents an arachidonic acid radical. However, better results are obtained with cephalins or lecithins in which the arachidonic acid radical is contained in the alpha position thereof, and especially desirable are the cephalins and lecithins in which arachidonic acid radicals are contained in both the alpha and beta positions thereof. It will be apparent that for the purposes of this invention the fatty acid ester group in lecithins and cephalins which does not contain an arachidonic acid radical may have substituted therein any fatty acid suitable for administration to animals and human beings. Further, the naturally-occurring lecithins and cephalins usually contain an unsaturated fatty acid radical in the alpha position, and a saturated fatty acid radical in the beta position. Consequently, these arachidonic acid-containing phospholipids of the lecithin or cephalin type may contain an arachidonic acid radical in the alpha position and any saturated fatty acid radical in the beta position. Consequently, these arachidonic acid-containing phospholipids of the lecithin or cephalin type may contain an arachidonic acid radical in the alpha position and any saturated fatty acid radical in the beta position, although any fatty acid radical of the aforementioned character may be suitably contained in the beta position thereof.

Although the benefits of this treatment can be obtained with any arachidonic acid-containing phospholipid preparation, better results may be achieved with an arachidonic acid-containing phospholipid preparation substantially free from proteinaceous substances. Furthermore, especial advantage in the treatment of this invention can be provided with an arachidonic acid-containing phospholipid preparation substantially free from both proteinaceous substances and lipids other phospholipids. Accordingly, it will be apparent that desirable control of the treatment of this invention in animals or human beings afflicted with hypercholesterolemia can be afforded with a preparation of substantially pure arachidonic acid-containing phospholipid.

This arachidonic acid-containing phospholipid may be prepared from an extract beef liver by the method of Bloor, Journal of Biological Chemistry; 80, 443–454 (1928), wherein beef liver tissue is extracted with hot 95% ethanol, wherein the resulting alcohol extracted is separated from the residue of the liver tissue, and wherein the lipids are separated from the separated alcohol extract by selective extraction with petroleum ether. After removing residual alcohol from the petroleum ether extract, the phospholipids can be separated from other lipids in the petroleum ether extract by precipitation with acetone. Thereafter, the lecithins and cephalins in this acetone precipitate can be separated on the basis of their relative solubility in alcohol, i.e. the lecithins are soluble in alcohol, while the cephalins are insoluble in alcohol. These phospholipid preparations derived from beef liver have been found to contain from 10 to 16% by weight arachidonic acid when analyzed by tentative assay procedure No. Cd 7–48 of the American Oil Chemists Society. Bloor has reported that the cephalin fraction of beef liver contains about 19% of arachidonic acid, while the lecithin fraction contains about 21% of arachidonic acid. Further purification of this phospholipid fraction of beef liver may be obtained by chromatographic adsorption on silicic acid and subsequent elution with mixtures of solvents, such as chloroform and methanol. Also, this arachidonic acid-containing phospholipid may be obtained by an organic synthetic process in which at least one fatty acid radical of a phosphatide is substituted with an arachidonic acid radical by a method involving transesterification of a phosphatide with arachidonic acid or an alkyl ester of arachidonic acid.

The advantages of this invention can be achieved by administering the arachidonic acid-containing phospholipid to a patent afflicted with hypercholesterolemia either orally or parenterally. However, for practical purposes, it is desirable to obtain this treatment by oral administration of the arachidonic acid-containing phospholipid. The term "hypercholesterolemia" refers to a serum cholesterol content in excess of that which is physiologically desirable.

This treatment may be carried out by administering the arachidonic acid-containing phospholipid in a form which is dictated by the physical and chemical characteristics of phospholipids. That is, the oral administration of this phospholipid may be as a dry powder in the form of a tablet or capsule, or as an aqueous suspension. Furthermore, this arachidonic acid-containing phospholipid may be combined with an ethyl or propyl ester of linoleic acid or a linoleic acid-containing triglyceride to obtain the combined advantages of these two treatment concepts. Moreover, pyridoxine may also be included in this combination of the arachidonic acid-containing phospholipid to obtain the advantages thereof in lipid metabolism, especially in treating a pyridoxine-deficient animal or human being. In this embodiment, there may be produced an oil-in-water emulsion containing approximately 40% of safflower oil, and in each 4 oz. dose thereof, 1.62 mg. of pyridoxine hydrochloride, 24.0 gms. of refined safflower oil, 68 mg. of mixed alpha and beta tocopherols, 6.8 mg. of propyl gallate and 34 mg. of citric acid. Also, sodium benzoate may be included in this safflower oil emulsion to prevent bacterial contamination. The arachidonic acid-containing phosholipid, such as the phosphatide preparation derived from beef liver, may be included in this safflower oil emulsion at a concentration such as to obtain in each 4 oz. dose thereof about 2.7 g. of arachidonic acid.

It has been found that the oral administration of an amount of beef liver phosphatides equivalent to about 5.4 gms. of arachidonic acid will produce a greater lowering of the serum cholesterol level than about 45 gms. of ethyl linoleate or 67 gms. of trilinoleate, a triglyceride containing three linoleic acid radicals, on a daily dosage basis. Moreover, these findings indicate that the beef liver arachidonic acid-containing phospholipid preparation, in an amount equivalent to about one-tenth the amount of ethyl linoleate or trilinoleate, will produce an oral administration an approximately 50% greater reduction in serum cholesterol level. Thus, a significant lowering of the blood cholesterol level in animals or human beings afflicted with hypercholesterolemia can be obtained by the oral administration on a daily basis of the equivalent of about 5.0 gms. of this arachidonic acid-containing phospholipid preparation.

This invention can be further illustrated by the following specific examples:

*Example I*

An arachidonic acid-containing phospholipid may be obtained from beef liver tissue by the following method:

Beef liver tissue is extracted with two volumes of hot 95% ethanol to obtain an ethanol extract thereof, and such ethanol extract is separated from the residue of the liver tissue by centrifugation. The separated ethanol extract is combined with petroleum ether to obtain a two phase solvent system in which the lipids are selectively extracted in the petroleum ether phase thereof. The petroleum ether phase of such solvent system is separated from the alcohol phase thereof by decantation to obtain a petroleum ether solution of the liver lipids substantially free from contaminant substances. The separated alcohol solution may be treated with additional amounts of the petroleum ether in a similar manner to provide further recovery of the liver lipids.

The petroleum ether solution of liver lipids is combined with acetone in such amount as to selectively insolubilize in the resulting mixture the phospholipids, and the resulting precipitate can be separated from the supernatant liquid to obtain a phospholipid preparation substantially free from other liver lipids.

This separated precipitate can be subject to evaporation to obtain the liver phospholipids in dry powder form. This dry powder liver phospholipid preparation contains about 12% by weight of arachidonic acid in the form of arachidonic acid-containing phospholipids.

*Example II*

A female patient, age 55, afflicted with diabetes mellitus and manifesting xanthelasma, identified as "RGON," was subjected to treatment with a variety of therapeutic agents to ascertain their relative efficacy in lowering the serum cholesterol level, according to the following procedure:

At intervals of 5 days or less, during the period of treatment, there were obtained metabolic studies involving the total serum cholesterol level, the iodine value of the fatty acid components of serum cholesterol esters, and the ratio of total serum cholesterol to serum phospholipid.

The treatment covered a period of 85 days, and during this period various therapeutic agents known to be effective in lowering the serum cholesterol level were introduced into the diet. Constantly, there was administered to the patient during the course of treatment the equivalent of 900 calories of carbohydrate per day and the equivalent of 250 calories of protein per day.

On the first day of treatment, and for 20 days thereafter, there was included in the diet the equivalent of 750 calories of coconut oil per day. Then, from the 20th to 40th day of treatment there was included in the diet the equivalent of 750 calories of the arachidonic acid-containing phospholipid obtained according to the method of Example I. Thereafter, from the 40th to the 55th day of treatment, there was included in the diet the equivalent of 375 calories per day of such arachidonic acid-containing phospholipid preparation and the equivalent of 375 calories per day of coconut oil. Further, from the 55th to 70th day of treatment, there was included in the diet the equivalent of 375 calories per day of coconut oil and the equivalent of 375 calories per day of ethyl linoleate. Then, from the 70th to 78th day of treatment, there was included in the diet the equivalent of 150 calories per day of coconut oil and 600 calories per day of ethyl linoleate. Thereafter, from the 78th to 85th day of treatment, i.e. until the termination of the treatment period, there was included in the diet the equivalent of 150 calories per day of coconut oil and the equivalent of 600 calories per day of trilinoleate.

The results of the total serum cholesterol analyses during the treatment period, in terms of milligram per 100 cc. were as follows:

| Days | 0 | 5 | 10 | 15 | 20 | 25 | 30 | 35 | 40 |
|---|---|---|---|---|---|---|---|---|---|
| | 310 | 275 | 335 | 260 | 315 | 220 | 205 | 225 | 230 |

| Days | 45 | 50 | 55 | 60 | 65 | 70 | 75 | 80 | 85 |
|---|---|---|---|---|---|---|---|---|---|
| | 260 | 225 | 320 | 250 | 280 | 310 | 250 | 255 | 265 |

The determination of the iodine value of the fatty acid components of the serum cholesterol esters otbained during the course of treatment were as follows:

| Days | 15 | 20 | 25 | 30 | 35 | 40 | 45 | 50 |
|---|---|---|---|---|---|---|---|---|
| | 120 | 125 | 200 | 140 | 150 | 185 | 190 | 200 |

| Days | 55 | 60 | 65 | 70 | 75 | 80 | 85 |
|---|---|---|---|---|---|---|---|
| | 175 | 170 | 150 | 145 | 130 | 150 | 145 |

The daily ratios of total serum cholesterol to serum phospholipid during the course of treatment were as follows:

| Days | 0 | 5 | 10 | 15 | 20 | 25 | 30 | 35 | 40 |
|---|---|---|---|---|---|---|---|---|---|
| | .98 | .99 | .95 | .89 | .98 | .90 | .75 | .91 | .86 |

| Days | 45 | 50 | 55 | 60 | 65 | 70 | 75 | 80 | 85 |
|---|---|---|---|---|---|---|---|---|---|
| | .99 | .82 | 1.00 | .99 | .76 | 1.12 | .88 | 1.03 | 1.10 |

The foregoing results demonstrate the efficacy of this arachidonic acid-containing phospholipid in lowering the serum cholesterol level in patients afflicted with hypercholesterolemia when the amount thereof is in the order of one-tenth as much as that of other serum cholesterol lowering factors.

*Example III*

An arachidonic acid-containing phospholipid suitable for employment in the treatment of this invention can be prepared by the following method:

Fresh beef or pork liver tissue is subjected to a grinding operation, and the ground liver tissue is mixed with 3 volumes of water. The resulting slurry is heated to a temperature of 40° C. for a period of ten minutes. Thereafter, the temperature of such slurry is increased to 100° C. Then, the slurry is subjected to centrifugation, and the separated tissue solids are dried by evaporation.

To 200 pounds of the dry tissue solids is added 75 gallons of heptane, and the resulting slurry is heated at a temperature of 50° C., with stirring, for a period of three hours. Thereafter, the supernatant liquid is separated from the tissue residue by decantation. Then, 75 gallons of heptane is combined with the tissue residue, and the resulting slurry is heated at a temperature of 50° C. for a period of one hour. Thereafter, the slurry is subjected to filtration, and the resulting filtrate is combined with the supernatant liquid from the foreging decantation step.

These combined extracts are concentrated to a volume of 6 gallons by distillation. The resulting concentrate is added to 30 gallons of acetone at a temperature of 25° C., with stirring. The viscous oil phase thereupon produced in the aqueous acetone mixture is separated by decantation, and such viscous oil is added to an additional portion of 30 gallons of acetone. Accordingly, there is obtained an amorphous precipitate which solidifies upon removal of the acetone by distillation at a reduced pressure.

The separated solid is obtained in a yield of 2,865 grams.

*Example IV*

An arachidonic acid-containing phospholipid suitable for employment in the treatment of this invention can be prepared by the following method:

Fresh beef or pork liver is subjected to a grinding operation, and the ground liver tissue is dried under vacuum. To 100 pounds of the dry liver tissue is added 35 gallons of ethylene dichloride, and the resulting slurry is heated at a temperature of 50° C. for a period of three hours, with stirring. Then, the supernatant liquid is separated from the tissue residue by decantation. The separated tissue residue is combined with an additional 35 gallons of ethylene dichloride, and the resulting slurry is heated at a temperature of 50° C. for a period of one hour, with stirring. Thereafter, the slurry is subjected to centrifugation, and the resulting centrifugate is combined with the supernatant liquid from the foregoing decantation step.

These combined extracts are concentrated to a volume of six gallons under reduced pressure. The resulting concentrate is added to 30 gallons of acetone at a temperature of 25° C. with stirring. The acetone phase of the resulting mixture is separated from the lipid phase, and the separated lipid is washed with an additional 30 gallons of acetone. The washed lipid is then dried under reduced pressure.

This dry lipid is obtained in a yield of about 4%, based upon the amount of dry liver powder starting material.

*Example V*

The lipid preparations obtained by the methods of Examples III and IV, upon fatty acid analysis according to tentative method Cd7–48 of the American Oil Chemists Society, will yield the following results:

| Conjugated acids: | Percent |
|---|---|
| Diene | 2.41 |
| Triene | 0.0 |
| Tetraene | 0.0 |
| Non-conjugated acids: | |
| Linoleic | 0.07 |
| Linolenic | 0.0 |
| Arachidonic | 12.48 |
| Oleic acid | 5.5 |
| Saturated acid | 75.09 |

Also, there is obtained on administration of this arachidonic acid-containing phospholipid, in addition to the reduction in serum cholesterol level, an increase in the stool content of alpha steroids as demonstrated by the precipitation of such steroids with digitonin.

As set out hereinbefore, the significant therapeutic agent is not the arachidonic acid but the phospholipid fraction which is identified by its arachidonic acid content. The discovery is that a phospholipid, which is identified as the acetone precipitated fraction which contains 10% or more of arachidonic acid, gives, in contrast with prior serum cholesterol-lowering materials, such as liver, linoleic acid containing triglycerides, and other triglycerides as obtained from marine oils, a much more rapid lowering of the serum cholesterol level and a rapid and greater increase in the iodine value of the cholesterol ester fatty acids.

In many cases, it is important for the patient to avoid the ingestion of triglycerides, fats, etc. For example, in the treatment of persons afflicted with atherosclerosis and displaying symptoms of hypercholesterolemia, it is undesirable to permit the ingestion of substantial amounts of triglyceride as such individuals characteristically have impaired metabolism. Since the arachidonic acid-containing phospholipid is isolated and may be substantially free of lipids other than phospholipid and may be free of proteinaceous substances, the phospholipid fraction may be effectively used in the treatment of such persons and other persons whose condition does not tolerate the ingestion of relatively large amounts of triglycerides, fats, etc.

The dosage on a daily basis is not critical and may be varied widely depending upon the condition and needs of the patient. However, for ordinary situations, it is usually found desirable to administer at least 200 mg. of the arachidonic acid-containing phospholipid and, as stated hereinbefore, the dose may be as high as 75 gms.

The phospholipid fraction may be administered with any desired amount of triglyceride or other substance and, where the condition of the patient requires it, may be administered with substantially no triglycerides, proteinaceous substance, etc.

While in the foregoing specification various embodiments of this invention have been set forth in considerable detail for the purpose of illustration, it will be apparent to those skilled in the art that this invention is susceptible to other embodiments and that many of the details can be varied widely without departing from the basic concept and spirit of the invention.

I claim:

1. In treatment to obtain lowering of the serum cholesterol level in a mammal afflicted with hypercholesterolemia, the administration on a daily basis to said mammal of at least 200 mg. of an isolated phospholipid containing at least 10% by weight of arachidonic acid and being substantially free from proteinaceous substances.

2. The treatment as provided in claim 1 in which the phospholipid is administered orally.

3. The treatment as provided in claim 1 in which said mammal is a human being.

4. In treatment to obtain lowering of the serum cholesterol level in a mammal afflicted with hypercholesterolemia, the administration on a daily basis to said mammal of a preparation consisting essentially of at least 200 mg. of a phospholipid containing at least 10% by weight of arachidonic acid and being substantially free from proteinaceous substances.

5. In treatment to obtain lowering of the serum cholesterol level in a mammal afflicted with hypercholesterolemia, the administration on a daily basis to said mammal of an arachidonic acid-containing phospholipid containing at least 10% by weight of arachidonic acid and being substantially free from lipids other than phospholipids.

6. In treatment to obtain lowering of the serum cholesterol level in a human being afflicted with hypercholesterolemia, the administration thereto on a daily basis of at least 200 mg. of an isolated phospholipid fraction containing at least 10% by weight of arachidonic acid.

References Cited by the Examiner

Biskind: J. of Insur. Med., vol. 5, No. 3, pp. 17–28, June–August 1950.

Biskind: J. Insur. Med., vol. 6, No. 1, pp. 17–28, December 1950–February 1951.

Deuel: The Lipids, Interscience, vol. II, 1955, pp. 532–533 and 709.

Kinsell: Lancet, No. 7016, p. 338, Feb. 15, 1958.

Matsumoto: Chem. Abst., vol. 47, p. 7692 (c–g), 1953.

Stewart: Lancet, vol. XVII, April 28, 1956, pp. 521–526.

JULIAN S. LEVITT, *Primary Examiner.*

MORRIS O. WOLK, *Examiner.*

UNITED STATES PATENT OFFICE
CERTIFICATE OF CORRECTION

Patent No. 3,197,371                          July 27, 1965

Joseph P. Dailey

It is hereby certified that error appears in the above numbered patent requiring correction and that the said Letters Patent should read as corrected below.

Column 2, lines 31 to 39, the formula should appear as shown below instead of as in the patent:

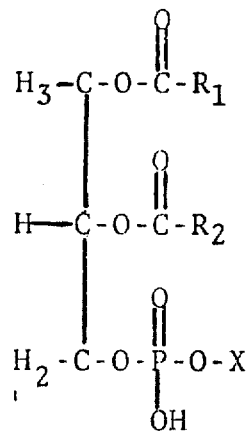

Column 3, line 37, after "other" insert -- than --; column 4, line 2, for "patent" read -- patient --; line 47, for "hypercholesterolemina" read -- hypercholesterolemia --.

Signed and sealed this 19th day of July 1966.

(SEAL)
Attest:

ERNEST W. SWIDER                            EDWARD J. BRENNER
Attesting Officer                         Commissioner of Patents